United States Patent [19]

Goggans et al.

[11] Patent Number: 4,801,482
[45] Date of Patent: Jan. 31, 1989

[54] ELASTIC NONWOVEN PAD

[75] Inventors: Gary L. Goggans; Cherie H. Everhart, both of Alpharetta; Stephen O. Chester, Woodstock; J. Eric Frost, Roswell; Monica V. Ozbirn, Dunwoody, all of Ga.

[73] Assignee: Kimberly-Clark Corporation, Roswell, Ga.

[21] Appl. No.: 919,298

[22] Filed: Oct. 15, 1986

[51] Int. Cl.$^4$ ............................................... B32B 1/04
[52] U.S. Cl. .................................... 428/68; 5/500; 428/152; 428/182; 428/184; 428/186; 428/198; 428/284; 428/287; 428/296; 428/298; 428/299; 428/326; 428/340; 428/903
[58] Field of Search ............... 428/137, 138, 152, 182, 428/184, 186, 198, 284, 287, 297, 298, 299, 296, 903, 340, 326, 53, 68; 5/500

[56] References Cited

U.S. PATENT DOCUMENTS

| | | | |
|---|---|---|---|
| 2,623,031 | 12/1952 | Snyder | 260/45.4 |
| 2,903,387 | 9/1959 | Wade | 154/101 |
| 3,016,599 | 1/1962 | Perry | 28/78 |
| 3,290,702 | 12/1966 | Seltzer | 5/334 |
| 3,594,266 | 7/1971 | Okazaki | 161/173 |
| 3,642,565 | 2/1972 | Ogata et al. | 161/173 |
| 3,673,060 | 6/1972 | Murphy et al. | 161/126 |
| 3,700,545 | 10/1972 | Matsui et al. | 161/175 |
| 3,849,241 | 11/1974 | Butin | 161/169 |
| 3,932,682 | 1/1976 | Loft et al. | 428/296 |
| 3,949,128 | 4/1976 | Ostermeier | 428/152 |
| 4,100,324 | 7/1978 | Anderson et al. | 428/288 |
| 4,150,674 | 4/1979 | Yung | 428/288 |
| 4,234,652 | 11/1980 | Vanomi et al. | 428/296 |
| 4,251,587 | 2/1981 | Mimura et al. | 428/233 |
| 4,296,163 | 10/1981 | Emi et al. | 428/212 |
| 4,318,408 | 3/1982 | Korpman | 128/287 |
| 4,375,446 | 3/1983 | Fujii et al. | 264/518 |
| 4,426,417 | 1/1984 | Meitner et al. | 428/195 |
| 4,426,420 | 1/1984 | Likyhani | 428/224 |
| 4,442,062 | 4/1984 | Fujii et al. | 264/518 |
| 4,461,049 | 7/1984 | Hammond | 5/498 |
| 4,555,811 | 12/1985 | Shimalla | 2/51 |

FOREIGN PATENT DOCUMENTS 1575830 10/1980 United Kingdom .
2132939A 7/1984 United Kingdom .

OTHER PUBLICATIONS

Akzo Plastics Technical Bulletin AL 1-e, 10/84.
A. Schulman Inc. Technical Data Sheet for Arnitel, 9/84.
A. Schulman Inc. Technical Data Sheet for Arnitel S, 5/85.

Primary Examiner—James J. Bell
Attorney, Agent, or Firm—Karl V. Sidor

[57] ABSTRACT

An elastic pad which is elastic in at least one direction, includes an elastic sheet having at least one nonelastic nonwoven web joined thereto at least at two areas. The nonelastic web is gathered between the two areas. The sheet may be formed from a polyetherester and the nonelastic nonwoven web may be a web of spunlaced hydraulically entangled polyester fibers. The nonelastic nonwoven web may also include rayon or wood pulp fibers.

49 Claims, 4 Drawing Sheets

ELASTIC NONWOVEN PAD

FIELD OF THE INVENTION

The present invention falls within the field of elastic fabrics.

BACKGROUND OF THE INVENTION

The advent of formation of plastic materials such as plastic sheets, films and nonwoven webs by extrusion processes such as, for example, slot film extrusion, blown bubble film extrusion, meltblowing of nonwoven webs and spinbonding of nonwoven webs allowed a wide variety of products to be manufactured so inexpensively that they could be viewed as disposable after only one or a few uses.

One product area in which those in the art have been attempting to manufacture goods in an inexpensive manner is the bedding area and, in particular, mattress pads. Inexpensive mattress pads have the advantage in commercial applications such as hospitals of being discarded after only one or a few uses. The savings in laundry costs offsetting a part, if not all, of the cost of the pad. Unfortunately, a problem which exists in most mattress pads and, in particular, the more inexpensively made mattress pads is that the pad tends to bunch up on the surface of the mattress or, in some instances, pull off of one or more of the corners of the mattress, in response to movement (tossing and turning) on the part of an individual. In response to this problem mattress pads have been provided with elastic corner straps to aid in retention of the mattress pad about the corners of the mattress. However, prior to the present invention, no totally satisfactory solution to the "bunching up" problem existed.

Another problem which has been present in this area is that when the mattress pad has been made of a composite material including a number of layers of different materials joined together, the layers, when joined together by an adhesive or by other conventional thermal bonding configurations, have tended to separate at the points of joining if the mattress pad was washed. This separation resulted from the adhesive or other joining mechanism degrading at the temperature present in commercial washing operations. Yet another problem associated with the prior mattress pads is that, if these pads include multiple layers joined by stitching, the stitching sometimes comes apart and allows the quilting material to move freely between the sandwiching layers.

One other area in which those of skill in the art have been attempting to manufacture goods in an inexpensive manner is the food service area and, in particular, the area of tablecloths or table pads. Inexpensive tablecloths or pads have the advantage of being discardable after only one or a few uses. The savings in laundry costs offsetting a part, if not all, of the cost of the tablecloth or pad. Unfortunately, a problem which exists in most tablecloths or pads and, in particular, the more inexpensively made tablecloths or pads is that the cloth tends to slide easily off of the table which it is covering.

The elastic mattress pads and elastic table pads made in accordance with the present invention may also be utilized where re-use is desired. In such situations a desirable feature of the elastic pads is that, after laundering, these pads, as a result of their elasticity have the ability to be stretched about a mattress or table pad even though some shrinkage may have occurred as a result of the laundering process. Thus the elastic pads of the present invention are superior to those of the prior art in that they can be easily and readily applied to, for example, a mattress or table top after the occurrence of shrinkage.

Some of the other problems in this area are the provision of a bulky material which is resilient and flexible while still having a pleasing feel. Other characteristics which are desirable are the ability to withstand unraveling during cutting and sewing operations, good puncture resistance, wet strength and a low linting factor.

DEFINITIONS

The term "elastic" is used herein to mean any material which, upon application of a biasing force, is stretchable, that is, elongatable, to a stretched, biased length which is at least about 125 percent, that is about one and one quarter, of its relaxed, unbiased length, and which, will recover at least 40 percent of its elongation upon release of the stretching, elongating force. A hypothetical example which would satisfy this definition of an elastic material would be a one (1) inch sample of a material which is elongatable to at least 1.25 inches and which, upon being elongated to 1.25 inches and released, will recover to a length of not more than 1.15 inches. Many elastic materials may be stretched by much more than 25 percent of their relaxed length, for example, 100 percent or more, and many of these will recover to substantially their original relaxed length, for example, to within 105 percent of their original relaxed length, upon release of the stretching, elongating force.

As used herein, the term "nonelastic" refers to any material which does not fall within the definition of "elastic," above.

As used herein the term "recover" refers to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent and would have a stretched length that is 150 percent of its relaxed length. It this exemplary stretched material contracted, that is recovered to a length of one and one tenth (1.1) inches after release of the biasing and stretching force, the material would have recovered 80 percent (0.4 inch) of its elongation.

As used herein the term "nonwoven web" means a web of material which has been formed without use of weaving processes which produce a structure of individual fibers or threads which are interwoven in an identifiable repeating manner. Nonwoven webs have been, in the past, formed by a variety of processes such as, for example, meltblowing processes, spinbonding processes, film aperturing processes and staple fiber carding processes.

As used herein the term "microfibers" means small diameter fibers having an average diameter not greater than about 100 microns, preferably having a diameter of from about 0.5 microns to about 50 microns, more preferably having an average diameter of from about 4 microns to about 40 microns.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter. Thereafter, the meltblown microfibers are carried by the high velocity gas stream and are deposited on a collecting surface to form a web of randomly disbursed meltblown microfibers. Such a process is disclosed, for example, in U.S. Pat. No. 3,849,241 to Butin and the disclosure of this patent is hereby incorporated by reference.

As used herein the term "sheet" means a layer which may be either a film or a nonwoven web.

As used herein, the term "stretch-bonded laminate" refers to a material having at least two layers of nonwoven webs and/or films with at least one of the layers of nonwoven webs and/or films being elastic and at least one of the layers of the nonwoven webs and/or films being nonelastic. The elastic nonwoven web or film layer is joined to the nonelastic nonwoven web or film layer at intermittent joining points or areas while the nonwoven webs and/or films are in juxtaposed configuration and while the elastic nonwoven web or film has a tensioning force applied thereto in order to bring the elastic nonwoven web or film to a stretched condition. Upon removal of the tensioning force after joining of the webs and/or films, the elastic nonwoven web or film will attempt to recover to its unstretched condition and will thereby gather the noneleasitc nonwoven web or film between the points or areas of joining of the two layers. The composite material is elastic in the direction of stretching of the elastic layer during joining of the layers and may be stretched until the gathers of the nonelastic nonwoven web or film layer have been removed. A stretch-bonded laminate may include more than two layers. For example, the elastic nonwoven web or film may have a nonelastic nonwoven web or film joined to both of its sides while it is in a stretched condition so that a three layer nonwoven web or film composite is formed having the structure of—gathered nonelastic (nonwoven web or film)/elastic (nonwoven web or film)/gathered nonelasitc (nonwoven web or film). Yet other combinations of elastic and nonelastic layers may be utilized.

As used herein the term "palindromic" means a multilayer laminate, for example a stretch-bonded laminate, which is substantially symmetrical. Examples of palindromic laminates would have layer configurations of A/B/A, A/B/B/A, A/A/B/B/A/A, A/B/C/B/A, etc. Examples of non-palindromic layer configurations would include A/B/C, A/B/C/A, A/B/C/D, etc.

As used herein the term "polyetherster" refers to any material having the general formula of:

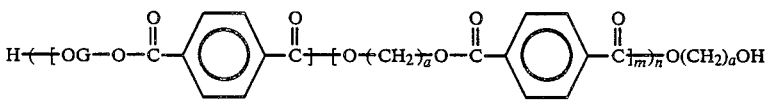

where

"G" is selected from the group including poly(oxyethylene)-alpha,omega-diol poly(oxypropylene)-alpha,omega-diol or poly(oxytetramethylene)-alpha,omega-diol and "m", "n" and "a" are positive integers. For example, "a" may be 2, 4 or 6.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, plasticizers, particulates and materials added to enhance processability of the composition.

OBJECTS OF THE INVENTION

Accordingly, it is an object of the present invention to provide a pad which is elastic and thus has the ability to readily conform to the surface of an item which it is to cover.

Another object of the present invention is to provide a pad which is elastic and thus has the ability to generally return to its original shape after having been stretched or otherwise bunched up.

An even further object of the present invention is to provide a pad made from a stretch-bonded laminate which is elastic, bulky and has a feel suitable for use in a variety of applications.

One other object of the present invention is to provide a pad made from a stretch-bonded laminate which does not delaminate after only one or a few washings.

Yet another object of the present invention is to provide a pad formed from a bulky laminate including a layer of meltblown polyetherester fibers joined to at least one layer of spunlaced hydraulically entangled polyester fibers.

An even further object of the present invention is to provide a pad formed from a bulky stretch-bonded laminate including a layer of meltblown polyetherester fibers joined to at least one layer of spunlaced hydraulically entangled polyester fibers.

Still further objects and the broad scope of applicability of the present invention will become apparent to those of skill in the art from the details given hereinafter. However, it should be understood that the detailed description of the presently preferred embodiment of the present invention is given herein only by way of illustration because various changes and modifications well within the spirit and scope of the invention will become apparent to those of skill in the art in view of this detailed description.

SUMMARY OF THE INVENTION

In response to the above-discussed problems the present invention provides a pad which is elastic in at least one direction. The pad may, for example, be a mattress pad, a table pad or a tablecloth. The elastic pad preferably includes an elastic sheet and at least one nonelastic, nonwoven web joined to the elastic sheet at least at two areas, with the nonelastic web being gathered between the two areas. The adhesive force joining the nonwoven web to the elastic sheet is greater than 2 kilograms. For example, the adhesive force joining the nonwoven web to the elastic sheet may vary from about 2.5 kilograms to about 4.5 kilograms.

The elastic sheet is preferably formed from a polyetherester material having the formula:

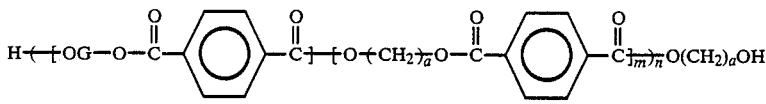

where
"G" is selected from the group including: poly(oxyethylene)-alpha,omega-diol poly(oxypropylene)-alpha,omega-diol poly(oxytetramethylene)-alpha,omega-diol and
"a", "m" and "n" are positive integers. For example, "a" may be 2, 4 or 6.

In particular, the polyetherester has a density of from about 1.10 to about 1.18 when measured in accordance with ASTM D-792; a melt point of from about 350° F. to about 400° F. when measured in accordance with ASTM D-2117; a tensile strength of from about 2,250 psi to about 3,250 psi when measured in accordance with ASTM D-638; an elongation at break of from about 600 percent to about 750 percent when measured in accordance with ASTM D-638; a flexural modulus of from about 6,500 psi to about 15,000 psi when measured in accordance with ASTM D-790 and a moisture absorption (at equilibrium, room temperature and 50 percent relatively humidity) of from about 0.28 percent to 0.34 percent.

More particularly, the polyetherester has a density of about 1.12 when measured in accordance with ASTM D-792; a melt point of about 383° F. when measured in accordance with ASTM D-2117; a tensile strength of about 2,468 psi when measured in accordance with ASTM D-638, an elongation at break of about 650 percent when measured in accordance with ASTM D-638 and a flexural modulus of about 7,258 psi when measured in accordance with ASTM D-790.

Alternatively, the elastic sheet may be formed from an aromatic polyetherurethane having a melt flow of from about 30 grams per ten minutes to about 60 grams per ten minutes when measured at 190 degrees C. and with a 8,700 gram load; an elongation of from about 400 percent to about 600 percent; a modulus of elongation at 100 percent of from about 800 psi to about 1,000 psi; a modulus of elongation at 300 percent of from about 1.10 to about 1.3 and an abrasion resistance of from about 20 mg to about 30 mg per 1,000 cycles. The aromatic polyetherurethane has a melt index of from about 5 grams per ten minutes to about 20 grams per ten minutes when measured at 190 degrees C. under a 2,160 gram load. More particularly, the polyetherurethane has a melt index of about 13.8 grams per ten minutes when measured at 190 degrees C. and under a 2,160 gram load; an elongation of about 500 percent; a modulus of elongation at 100 percent of about 900 psi; a modulus of elongation at 300 percent of about 1,700 psi, a specific gravity of about 1.20; and an abrasion resistance of about 25 mg per 1,000 cycles.

The elastic sheet is preferably an elastic nonwoven web of meltblown fibers, for example meltblown microfibers. The basis weight of the elastic nonwoven web of meltblown fibers in the relaxed condition may vary from about 10 grams per square meter to about 200 grams per square meter. For example, the basis weight of the elastic nonwoven web may vary from about 20 grams per square meter to about 100 grams per square meter.

The nonelastic web is preferably a nonwoven web of spunlaced hydraulically entangled polyester fibers. The nonelastic web may also include rayon fibers or wood pulp fibers. The nonelastic web preferably has a machine direction sheet grab tensile of from about 10 pounds to about 75 pounds; a cross-machine direction sheet grab tensile of from about 5 pounds to about 50 pounds; a machine direction trapezoid tear of from about 3 pounds to about 40 pounds; a cross-machine direction trapezoid tear of from about 2 pounds to about 45 pounds; a thickness of from about 10 mils to about 45 mils and a basis weight of from about 1 ounce to about 5 ounces per square yard. The nonelastic web may be apertured.

One particular nonelastic web of spunlaced hydraulically entangled polyester fibers has a basis weight of 1.0 ounces per square yard; a thickness of about 11 mils; a machine direction sheet grab tensile of about 17 pounds; a cross machine direction sheet grab tensile of about 8 pounds; a machine direction trapezoid tear of about 7 pounds and a cross machine direction trapezoid tear of about 3 pounds.

One particular apertured nonelastic web of spunlaced hydraulically entangled polyester fibers has a basis weight of about 1.3 ounces per square yard; a thickness of about 18 mils, a machine direction sheet grab tensile of about 25 pounds; a cross-machine direction sheet grab tensile of about 14 pounds; a machine direction trapezoid tear of about 7 pounds and a cross machine direction trapezoid tear of about 5 pounds.

In one embodiment one of the nonelastic webs of hydraulically entangled spunlaced polyester fibers could be deleted with a nonelastic web of dry laid polyester staple fibers joined by a hot melt polyester-based, powder-form adhesive being substituted therefor. The web of dry laid polyester-based staple fiber may have a basis weight of from about 5 grams per square meter to about 50 grams per square meter, for example about 14 grams per square meter. The polyester staple fibers have a length of from about 1.0 inches to about 2.0 inches, for example about 1.5 inches; a denier of from about 1.0 to about 2.0, for example a denier of about 1.5; a melting point of from about 450 degrees F. to about 500 degrees F., for example about 482 degrees F. and an elongation to break of from about 30 percent to about 50 percent, for example about 40 percent. The hot melt polyester-based adhesive used to hold the polyester staple fibers in a self-supporting web configuration has a density of from about 1.20 g/cm$^3$ to about 1.30 g/cm$^3$, for example about 1.24 g/cm$^3$ and a melt viscosity of from about 2,000 to 2,200 poise at 190 degrees C., for example a melt viscosity of about 2,100 poise at 190 degrees C. The dry laid web includes from about 78 percent to about 82 percent, by weight, of the polyester staple fibers and from about 18 percent to about 22 percent, by weight, of the hot melt adhesive.

In one embodiment the pad is formed from a palindromic stretch-bonded laminate which is elastic in at least one direction and which is adapted to stretch from at least about 50 percent to about 100 percent in that direction. This preferred laminate includes an inner elastic nonwoven web of meltblown polyetherester fibers having a relaxed basis weight of from about 20 grams per square meter to about 100 grams per square meter. Also included in this laminate are two outer nonelastic webs of hydraulically entangled spunlaced polyester fibers, each having an ungathered basis weight of from about 0.9 to about 1.1 ounces per square yard; a thickness of from about 10 mils to about 12 mils; a machine direction sheet grab tensile of from about 16 pounds to 18 pounds; a cross-machine direction sheet grab tensile of from about 7 pounds to about 9 pounds; a machine direction trapezoid tear of from about 6 pounds to about 8 pounds and a cross-machine direction trapezoid tear of from about 2 pounds to about 4 pounds.

Preferably, a bond pattern having a low bond area is utilized to form the stretch-bonded laminate. For example, no more than 15 percent of the surface of the nonelastic web may be bonded to the elastic sheet.

DETAILED DESCRIPTION OF THE INVENTION

Figure 1:
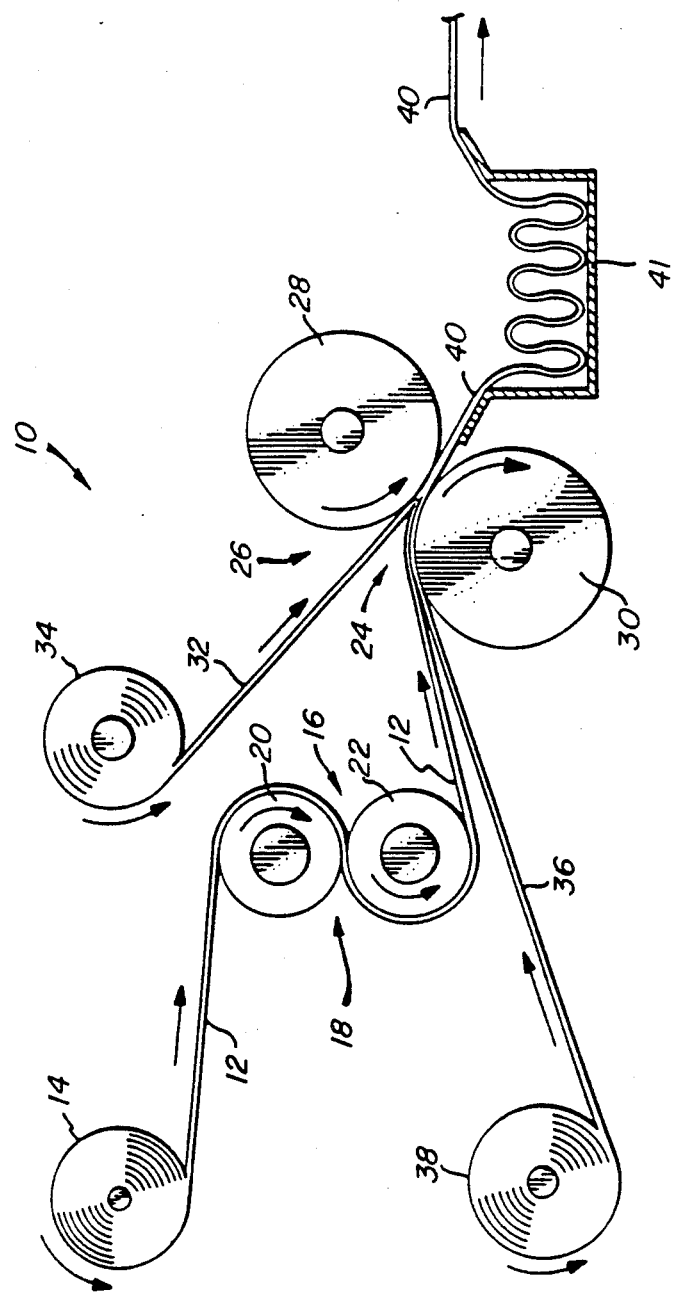
FIG. 1 is a schematic representation of a process for forming a stretch-bonded laminate from which the mattress pad of the present invention may be formed.

Referring now to the drawings where like reference numbers represent like or equivalent structure and, in particular, to FIG. 1, there is schematically illustrated at 10 a process for forming a stretch-bonded laminate by heat-bonding a nonelastic web to each of the two opposite sides of an elastic sheet which may be an elastic film or an elastic nonwoven web. The elastic sheet 12 is preferably formed from a polyetherester material.

One polyetherester may be obtained under the trade designation Arnitel, for example, Arnitel EM-400, from A. Schulman, Inc. of Akron, Ohio.

Schulman literature indicates that at least two grades of Arnitel are are available under the trade designations EM 400 and EM 460. This literature also reports certain properties of these materials which are summarized below in Table I.

TABLE I

| PROPERTY | EM-400 | EM-460 | MEASURED BY ASTM STANDARD |
|---|---|---|---|
| Density | 1.12 | 1.16 | D-792 |
| Melt Point | | | |
| (deg. F.) | 383 | 365 | D-2117 |
| (deg. C.) | 195 | 185 | |
| Water absorption at equilibrium at RT and 50% RH(%) | 0.32 | 0.30 | D-570 |
| Tensile strength (psi) | 2,468 | 3,048 | D-638 |
| Elongation at break (%) | 650 | 700 | D-638 |
| Flexural Modulus (psi) | 7,258 | 14,516 | D-790 |

From the table, above, it can be seen that these Arnitel polyetherester materials have a density of from about 1.10 to about 1.18 when measured in accordance with ASTM D-792; a melt point of from about 350° F. to about 400° F. when measured in accordance with ASTM D-2117; a water absorption at equilibrium, room temperature and 50 percent relative humidity of from about 0.28 percent to about 0.34 percent when measured in accordance with ASTM D-570; a tensile strength of from about 2,250 psi to about 3,250 psi when measured in accordance with ASTM D-638; an elongation at break of from about 600 percent to about 750 percent when measured in accordance with ASTM D-638 and a flexrual modulus of from about 6,500 psi to about 15,000 psi when measured in accordance with ASTM D-790.

More particularly, the Arnitel EM-400 polyetherester has a density of about 1.12 when measured in accordance with ASTM D-792; a melt point of about 383° F. when measured in accordance with ASTM D-2117; a water absorption of about 0.32 percent at equilibrium, room temperature and 50 percent relative humidity when measured in accordance with ASTM D-570; a tensile strength of about 2,468 psi when measured in accordance with ASTM D-638, an elongation at break of about 650 percent when measured in accordance with ASTM D-638 and a flexural modulus of about 7,258 psi when measured in accordance with ASTM D-790.

Alternatively, the elastic sheet 12 may be formed from an aromatic polyetherurethane having a melt flow of from about 30 grams per ten minutes to about 60 grams per ten minutes when measured at 190 degrees C. and under a 8,700 gram load; an elongation of from about 400 percent to about 600 percent; a modulus of elongation at 100 percent of from about 800 to about 1,000 psi; a modulus of elongation at 300 percent of from about 1,600 to about 1,800 psi; a specific gravity of from about 1.1 to about 1.3 and an abrasion resistance of from about 20–30 mg per 1,000 cycles. The aromatic polyetherurethane may have a melt index of from about 5 grams per 10 minutes when measured at 190 degrees C. under a 2,160 gram load. More particularly, the aromatic polyetherurethane has a melt flow of about 13.8 grams per ten minutes when measured at 190 degrees C. under a 2,160 gram load; an elongation of about 500 percent; a modulus of elongation at 100 percent of about 900 psi; a modulus of elongation at 300 percent of about 1,700 psi; a specific gravity of about 1.20 and an abrasion resistance of about 25 mg per 1,000 cycles. One such polyetherurethane can be obtained from the K. J. Quinn Co. under the trade designation PE-90.

Preferably, the elastic sheet 12 is a web of meltblown polyetherester fibers, for example microfibers, having a basis weight of from about 10 grams per square meter to about 200 grams per square meter. For example, the web may have a basis weight of from about 20 grams per square meter to about 100 grams per square meter.

The elastic sheet 12 may be unwound from a supply roll 14 of the elastic sheet material. The sheet 12 then travels in the direction indicated by the arrows associated therewith and passes through the nip 16 of the S roll arrangement 18 formed by the stacked rollers 20 and 22. Alternatively, the sheet 12 may be formed by known extrusion processes, for example, known film formation or known meltblowing processes, and passed directly through the nip 16 without being first stored on the supply roll 14. The sheet 12 passes through the nip 16 in a reverse-S path as indicated by the rotation direction arrows associated with the stacked rollers 20 and 22. From the S roll arrangement 18 the sheet 12 passes through the pressure nip 24 formed by a bonder roller arrangement 26. The bonder roller arrangement 26 includes a patterned calender embossing roller 28, for example a patterned calender embossing roller 28, for example a thermal pin embossing roller, and a smooth anvil roller 30.

A first nonelastic web 32 is unwound from a supply roll 34 and a second nonelastic web 36 is unrolled from a supply roll 38. The nonelastic nonwoven webs 32 and 36 are preferably formed from spunlaced web of hydraulically entangled polyester fibers. One or both of the webs 32 and 36 may also include rayon fibers or wood pulp fibers. The webs 32 and 36 of hydraulically entangled polyester fibers each has a machine direction sheet grab tensile of from about 10 pounds to about 75 pounds; a cross-machine direction sheet grab tensile of from about 5 pounds to 50 pounds; a machine direction trapezoid tear of from about 3 pounds to about 40 pounds; a cross-machine trapezoid tear of from about 2 pounds to about 45 pounds; a thickness of from about 10 mils to about 45 mils and a basis weight of from about 1 to 5 ounces per square yard. One or both of the webs 32 and 36 may be apertured.

One particular nonelastic web of hydraulically entangled polyester fibers has a basis weight of about 1.0 ounces per square yard; a thickness of about 11 mils; a machine direction sheet grab tensile of about 17 pounds; a cross machine direction sheet grab tensile of about 8 pounds; a machine direction trapezoid tear of about 7 pounds and a cross machine direction trapezoid tear of about 3 pounds.

One particular apertured nonelastic web of hydraulically entangled polyester fibers has a basis weight of about 1.3 ounces per square yard; a thickness of about 18 mils; a machine grab tensile of about 25 pounds; a cross-machine grab tensile of about 14 pounds; a machine direction trapezoid tear of about 7 pounds and a cross machine direction trapezoid tear of about 5 pounds.

Nonelastic webs of hydraulically entangled fibers of this type can be obtained from Du Pont under the trade designation Sontara, for example, Sontara 8001 and Sontara 8010. Typical physical characteristics of Sontara materials, as evidenced by Du Pont literature are stated below in Table II.

TABLE II

| TYPE | UNIT WEIGHT (oz/yd.$^2$) | THICKNESS (mils) | SHEET GRAB TENSILE (lbs) | | TRAPEZOID TEAR (lbs) | | MULLEN BURST (psi) | FRAZIER AIR PERMEABILITY (CFM/ft$^2$ @ 0.5" H$_2$O) |
|---|---|---|---|---|---|---|---|---|
| | | | MD | XD | MD | XD | | |
| 100% Polyester | | | | | | | | |
| 8000 | 1.2 | 14 | 23 | 14 | 6 | 5 | 40 | 500 |
| 8001 | 1.0 | 11 | 17 | 8 | 7 | 3 | 23 | 600 |
| 8010** | 1.3 | 18 | 25 | 14 | 7 | 5 | 33 | 750 |
| 8100 | 4.0 | 40 | 70 | 45 | 35 | 40 | 120 | 215 |
| 8103 | 2.0 | 22 | 40 | 22 | 14 | 8 | 50 | 290 |
| 8122** | 2.4 | 27 | 45 | 25 | 15 | 7 | 57 | 320 |
| 8125** | 1.8 | 17 | 31 | 16 | 11 | 5 | 44 | 420 |
| 70/30 Rayon/Polyester Blend | | | | | | | | |
| 8407** | 1.5 | 16 | 11 | 8 | 5 | 7 | 20 | 780 |
| 8423 | 2.3 | 26 | 13 | 15 | 4 | 5 | 24 | 255 |
| 55/45 Woodpulp/Polyester Blend | | | | | | | | |
| 8801 | 2.0 | 14 | 35 | 17 | 8 | 6 | 35 | 85 |
| 8808 | 2.0 | 14 | 35 | 17 | 8 | 6 | 35 | 85 |
| ASTM Test Method | D1117 Sec. 17 | D1117 Sec. 19 | D1117 Sec. 7 | | D1117 Sec. 14 | | D1117 Sec. 8 | D1117 Sec. 6 |

**Apertured style

Alternatively, one or both of the nonelastic webs could be formed of dry laid polyester staple fibers joined by a hot melt polyester-based, powder-form adhesive being substituted therefor. The dry laid web is formed by dry laying the polyester staple fibers, adding the polyester-based adhesive in a ground form from above and applying heat to melt the adhesive and join the polyester staple fibers. The web of dry laid polyester-based staple fiber may have a basis weight of from about 5 grams per square meter to about 50 grams per square meter, for example about 14 grams per square meter. The polyester staple fibers have a length of from about 1.0 inches to about 2.0 inches, for example about 1.5 inches; a denier of from about 1.0 to about 2.0, for example a denier of about 1.5; a melting point of from about 450 degrees F. to about 500 degrees F., for example about 482 degrees F. and an elongation to break of from about 30 percent to about 50 percent, for example about 40 percent. The hot melt polyester-based adhesive has a density of from about 1.20 g/cm$^3$ to about 1.30 g/cm$^3$, for example about 1.24 g/cm$^3$ and a melt viscosity of from about 2,000 to 2,200 poise at 190 degrees C., for example a melt viscosity of about 2,100 poise at 190 degrees C. The dry laid web includes from about 78 percent to about 82 percent, by weight, of the polyester staple fibers and from about 18 percent to about 22 percent, by weight, of the hot melt adhesive.

One such dry laid web may be obtained from the Carolina Formed Fabrics Corp. of Greenville, S.C.

under the trade designation Carelle. Carelle comes in a variety of basis weights and includes from about 78 percent to about 82 percent, by weight, of Kodel 41D polyester staple fibers and from about 18 percent to about 22 percent, by weight, of a polyester-based hot melt adhesive which may be obtained from Eastman under the trade designation FA-300.

The first nonelastic web 32 and the second nonelastic web 36 travel in the directions indicated by the arrows associated respectively therewith as supply rolls 34 and 38 rotate in the directions indicated by the respective arrows associated therewith. Both of the nonelastic webs 32 and 36 are directed to pass through the pressure nip 24 of the bonder roller arrangement 26 on the two opposite sides of the elastic sheet 12 as illustrated in FIG. 1. By virtue of the fact that the peripheral linear speed of the rollers 20 and 22 of the S roll arrangement 18 is controlled to be less than the peripheral linear speed of the rollers 28 and 30 of the bonder roll arrangement 26, the sheet 12 is stretched to a selected percent elongation and maintained in such stretched condition during bonding of the nonelastic webs 32 and 36 to the sheet 12 during their passage through the bonder roller arrangement 26. The degree of stretching of the elastic sheet 12 between the S roller arrangement 18 and the bonder roller arrangement 26 may be varied within the elastic limits of the polyetherester sheet 12 to effect different degrees of elongation (elasticity) of the stretch-bonded laminate formed upon bonding of the nonelastic webs 32 and 36 to the elastic sheet 12. In practice, to form a satisfactory elastic mattress pad therefrom, it has been found that an elastic stretch-bonded laminate having the ability to stretch at least 50 percent is desirable. For example, an elastic stretch-bonded laminate which is able to stretch from about 50 percent to about 100 percent is desirable. More particularly, an elastic stretch-bonded laminate which is able to stretch about 75 percent is more desirable. In order to form a stretch-bonded laminate having the above degrees of elasticity, it is necessary for the elastic sheet 12 to be stretched to a significantly greater degree upon bonding of the nonelastic webs 32 and 36 thereto. In this regard it has been generally found that the elastic sheet 12 should, upon bonding of the nonelastic webs 32 and 36 thereto, be stretched approximately two times the degree of desired elasticity in the stretch-bonded laminate. Thus, if a stretch-bonded laminate having 100 percent elasticity is desired, the elastic sheet 12 should be stretched about 200 percent at the moment of bonding.

While many bonding methods may be possible, a preferred method of bonding is by thermal bonding and, in particular, by thermal pin embossment where one or both of the patterned embossing calender roller 28 and the smooth anvil roller 30 are heated and the pressure between these two rollers is adjusted by well-known means to provide the desired temperature and bonding pressure to bond the webs 32 and 36 to the sheet 12 and thereby form a composite stretch-bonded elastic laminate 40. In thermal pin embossment bonding, the webs 32 and 36 are bound to the elastic sheet 12 by the action of lands or pins (not shown) which protrude from the calender roller 28 and cooperate with the anvil roller 30 to apply heat and pressure to selected intermittent areas of the three materials 12, 32 and 36 as they pass through the nip 24. This serves to bond them together. A variety of different bonding patterns can be effected in this manner to create a number of different visual effects. Representative bonding patterns are illustrated in FIGS. 3 through 7.

Figure 3:
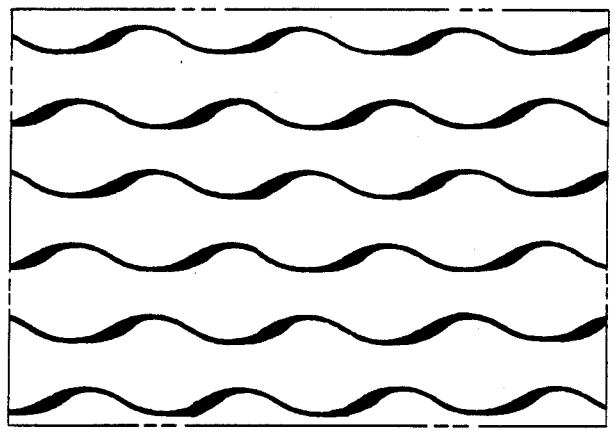
FIG. 3 is a plan view of a stretch-bonded laminate illustrating a bonding pattern.
Figure 4:
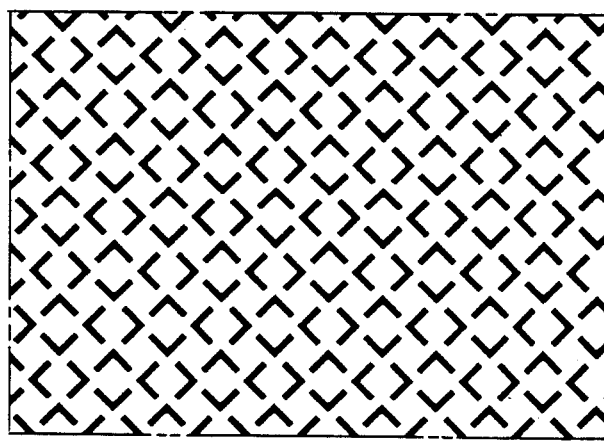
FIG. 4 is a plan view of a stretch-bonded laminate illustrating another bonding pattern.
Figure 5:
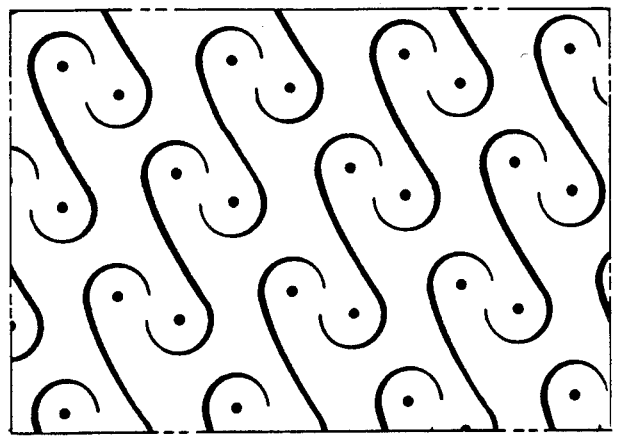
FIG. 5 is a plan view of a stretch-bonded laminate illustrating yet another bonding pattern.
Figure 6:
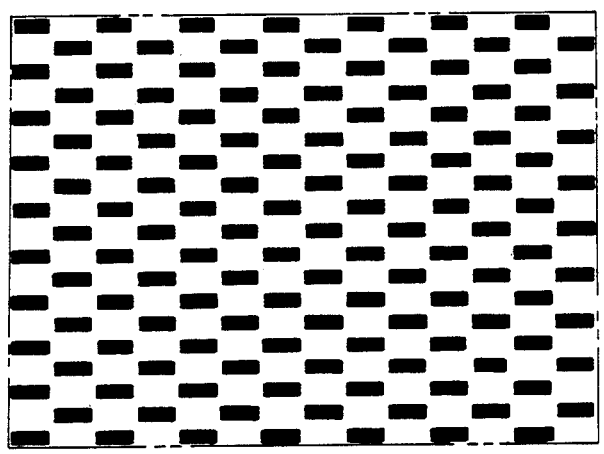
FIG. 6 is a plan view of a stretch-bonded laminate illustrating one other bonding pattern.
Figure 7:
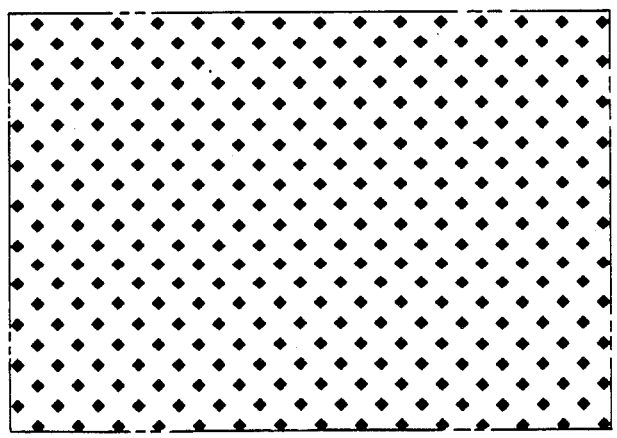
FIG. 7 is a plan view of a stretch-bonded laminate illustrating a further bonding pattern.

The elastic sheet 12 of the composite elastic laminate 40, upon emergence of the composite elastic laminate 40 from the pressure nip 24 of the bonder roll arrangement 26, is immediately relaxed and quickly recovers and gathers the nonelastic webs 32 and 36 between the intermittent bond areas formed by the bonder roller arrangement 26. Because the direction of stretching of the elastic sheet 12 is generally the same as the direction of travel of the three materials 12, 32 and 36 the generally parallel gathers in the nonelastic webs 32 and 36 will be generally perpendicular to the direction of travel of the composite elastic laminate 40. The bonding patterns not only effect different aesthetic patterns on the surface of the laminate but also control the degree of gathering of the nonelastic webs 32 and 36. Generally speaking, the greater the degree of bonding the lesser the degree of gathering of the nonelastic webs 32 and 36. For this reason it is generally preferred to utilize a bonding pattern that effects a low percentage of bond to nonbond area. Such a bond pattern is illustrated in FIG. 3. Generally speaking, a low bond to non-bond area refers to a bonding pattern that bonds no more than 15 percent of the surface of the nonelastic webs 32 and 36 to the elastic sheet 12.

Thereafter the composite elastic laminate 40 passes to a holding box 42 where it is maintained in a relaxed, unstretched condition for a length of time for the elastic sheet 12 to cool sufficiently to avoid its cooling while it is in a stretched condition and thereby losing all or a considerable proportion of its ability to contract from the stretched dimensions which it had assumed during bonding.

If the composite elastic laminate 40 is to be dyed, the holding box 42 may also serve as an arrangement to apply a liquid dye to the composite elastic laminate 40.

After a brief untensioned period of, for example, up to about 30 seconds, e.g., from about 3 seconds to about 20 seconds, in the holding box 42, the composite elastic laminate 40 is withdrawn therefrom and transferred to a storage roll (not shown). The provision of the holding box 42 or an equivalent structure allows the untensioned heat-bonded composite elastic laminate 40 to stabilize, that is cool, while it is in an untensioned arrangement. This allows the elastic sheet 12 to contract and gather the gatherable web immediately after bonding of the webs to each other. Additionally, this allows the elastic sheet 12 to cool in a relaxed, that is nontensioned, condition which avoids the elastic web becoming set at the stretched dimensions which it had assumed during bonding. If the elastic sheet 12 were to set in the tensioned state it would be unable to contract and form the generally parallel gathers in the nonelastic webs 32 and 36. Accordingly, the composite material 40 would not possess elasticity because any significant stretching of the composite would result in tearing of the nonelastic webs 32 and 36. In order to avoid loss of part or all of the elasticity of the composite elastic laminate 40, the composite elastic laminate 40 should be transferred to the storage roll in only a slightly tensioned condition. Also, the composite elastic laminate 40 should be stored under only slight tension.

It should be recognized that two directional elasticity in the stretch bonded laminate can be readily effected by stretching the sheet 12 in both the machine direction and cross machine direction at the moment of bonding. Such two directional stretching can be effected by such conventional arrangements as tenter frames and arched roller arrangements well known to those in the art. However, it has been generally found to be satisfactory for the mattress pad to be made from a one-direction stretch-bonded laminate.

Figure 2:
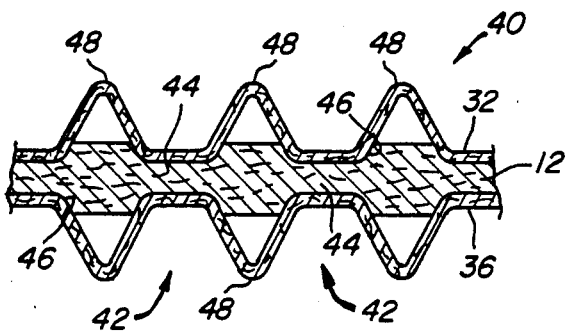
FIG. 2 is a cross-section of a stretch-bonded laminate formed by the process illustrated in FIG. 1 with the laminate being in a relaxed condition to illustrate the gathers.

FIG. 2 which is a cross-sectional view of the elastic composite laminate 40 illustrates that the elastic composite laminate 40 has a plurality of embossed bond sites 42 formed by the action of the raised portions of the embossing calender roller 28 in cooperation with the anvil roller 30. The temperature and pressure maintained in the nip 24 between the calender roller 28 and the anvil roller 30 was such that the pressure and temperature imposed by the raised portions of the calender roller 28 formed indentations 44 within the elastic sheet 12 by softening or melting the portions of the sheet 12. The peripheral portions 46 of the indentations 44 of the sheet 12 include a resolidified portion of the material which was formerly located in the indented area 44. The peripheral portions 46, upon resolidification after their softening or melting in the pressure nip 24 of calender roller 28 and anvil roller 30, tend to form a reasonably strong bond with the overlaid nonelastic webs 32 and 36. The nonelastic webs 32 and 36 are gathered between the bond sites 42 and these gathers are illustrated at 48. The bond sites 42 preferably effect interlayer joining of the nonelastic webs 42 and 46 to the elastic sheet 12 to the extent that the adhesive force joining the layers 32, 36 and 12 is at least 2 kilograms. For example, the adhesive joining force may be from about 2.5 kilograms to about 4.5 kilograms.

Figure 8:
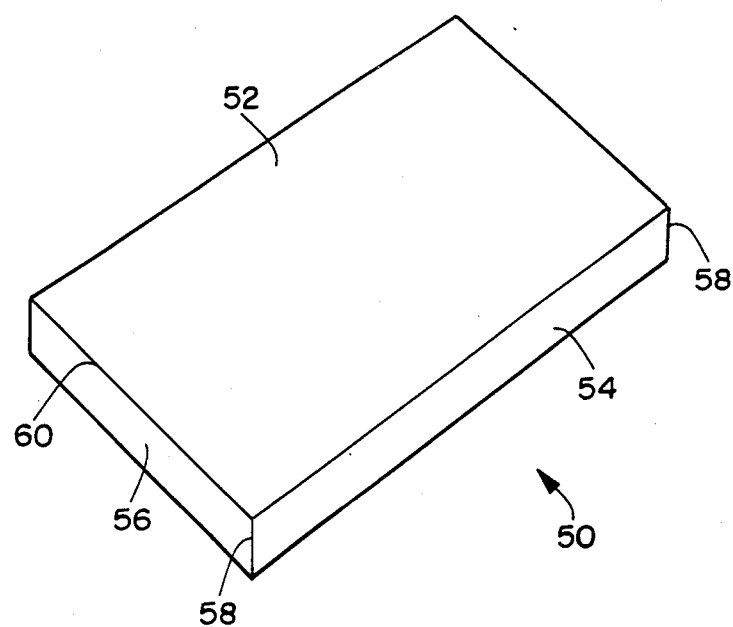
FIG. 8 is a perspective view of a mattress pad formed in accordance with the present invention.

FIG. 8 illustrates a mattress pad 50 formed in accordance with the present invention from a stretch-bonded laminate. The mattress pad 50 includes a top portion 52 with depending longitudinal side portions 54 and depending lateral end portions 56. Each of the corners 58 of the matress pad 50 may be provided with an angled portion (not illustrated) that extends at about a 45 degree angle between the side 54 and end 56 portions which adjoin thereat and which is generally parallel to the top portion 52. This angled portion serves to further aid in the retention of the mattress pad 50 onto the mattress.

Figure 9:
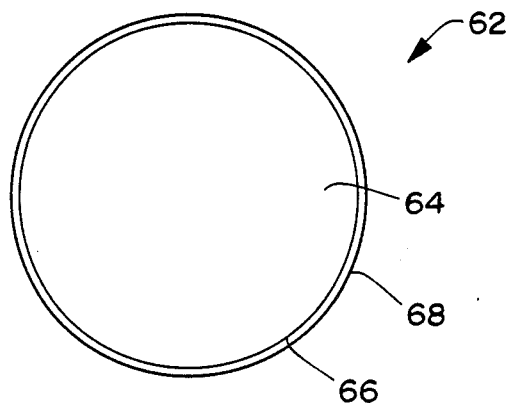
FIG. 9 is a plan view of a table pad formed in accordance with the present invention.

FIG. 9 is a plan view of an elastic tablecloth or pad 62. The elastic table pad 62 may be shaped to conform to any given table shape, for example circular, rectangular, for example square, or some irregular shape. The elastic table pad preferably includes a top portion 64 and an additional elastic strip 66 attached near the periphery 68 of the pad 62. The strip 66 may be attached by sewing or otherwise joining the strip 66 to the pad 62 while, for example, the strip 66 is in an extended state.

Alternatively, the elastic table pad 62 may be configured similarly to the elastic mattress pad 50 by providing the top portion 64 with depending side portions which are designed to retainingly engage the edges of a tabletop over which the elastic tablecloth or pad is to be placed. The elasticity of the table pad 62 which is preferably designed to be slightly less in size than the tabletop not only retains the table pad 62 on the tabletop but also maintains a generally uniform surface in view of the fact that the elasticity of the tablecloth 62 tends to make the tablecloth 62 return to a conformingly smooth configuration if it is stretched or otherwise distorted.

One or more cover fabrics may be attached to the top portion 64 of the table pad 62. Preferably the elastic table pad 62 is made from a stretch-bonded laminate having from about 40% to about 100% stretch in the machine direction and from about 0% to 40% stretch in the cross machine direction.

The elastic pads of the present invention possess a number of desirable characteristics such as, for example, the ability to conform to the corners of a mattress, the ability to generally return to their original size and shape when bunched up or otherwise distorted and the ability to withstand commercial laundering and low linting. This ability to conform to a mattress is particularly desirable when the mattress is a water bed mattress. When outer layers of hydraulically entangled spunlaced polyester nonwoven surface tapes are utilized the pad has a soft feel as a result of the outer hydraulically entangled surface webs. When the elastic pad is to be utilized as a table pad, the pad may be considered to be a custom pad because of the pad's ability to conform to the table top. In this regard the table pad could be designed to have sufficient elasticity to be able to stretchingly conform to the table top even after a number of leaves have been added.

The abrasion resistance of a stretch-bonded laminate from which the elastic pads of the present invention can be made was compared to that of several commercial materials by utilizing a Martindale abrasion Tester equipped with a rubber wheel. The laminate was a palindromic laminate having surface layers of Sontara 8001 and an interior layer of meltblown Arnitel 400. The basis weight of the interior layer was about 50 grams per square meter. The bond pattern utilized to form the stretchbonded laminate is illustrated in FIG. 3. The abrasion resistance of the materials was tested at 1.30 psi (9 KPa) and 1.74 psi (12 KPa). The results are reported in Table III below.

TABLE III

| Sample | 1.30 psi | 1.74 psi |
| --- | --- | --- |
| Spunbonded Polypropylene (Evolution) Quilted Pad | 2000 cycles - Slight Fuzz | 2000 cycles - Slight Fuzz |
| Cotton/Polyester 50/50, Quilted Pad | 2000 cycles - Slight Fuzz | 2000 cycles - Slight Fuzz |
| Cotton Quilted Pad | 2000 cycles - Slight Fuzz | 2000 cycles - Slight Fuzz |
| Needlepunched Polyester (Lifetime) | 200 cy. - Fuzzing 2000 cy. - Severe Fuzz and Pilling | 200 cy. - Fuzzing 2000 cy. - Severe Fuzz and Pilling |
| Spunbond Polyester Backing | 350 cycles - Torn Through | 200 cycles - Torn Through |
| Spunlace Polyester Backing (Nexus) | Not Tested | 1200 cycles - Torn Through |
| Sontara/Arnitel/ Sontara | 2000 cy. - Fuzzing | 200 cy. - Fuzzing 700 cy. - Exposure of Interior Layer |

The launderability of a sample of the same palindromic stretch-bonded laminate was tested under Sears launderability test No. TP1-53. The test included subjecting the laminate to 50 wash/dry cycles with the wash cycle set at warm water (about 110° F.) and the dry cycle set at medium (110°-160° F.). At the end of the 50 wash/dry cycles no delamination of the fabric was apparent. However, after 20 cycles, point holes began to appear at the bond sites and became progressively worse. At the end of the 50 wash/dry cycles a 75 percent reduction in load and a 30 percent reduction in elongation of the material had occurred.

The heat resistance of a sample of the same palindromic stretch-bonded laminate was tested by placing it on a varnished wood table and covering it with a cotton/poly tablecloth. A heat source was placed on the tablecloth for 10 seconds at 200 F., 300 F. and 420 F. No change was detected in the table surface, table pad fabric or table cloth at 200 F. and 300 F. At 420 F., the cotton/poly tablecloth began to char. No change was seen in the table surface. No charring, melting, stretch loss or loss of integrity was seen in the table pad fabric although the bulk of the fabric decreased substantially.

The adhesive force joining a sample of the same palindromic stretch-bonded laminate was calculated by obtaining a 2" (cross machine direction)×4" (machine direction) sample of the laminate and attaching the sample by double sided tape to a 2"×4" plate. A force of about 47.1 pounds was then applied to the laminate for 3 seconds to secure the laminate to the plate. Next a 1"×1" plate was attached to the remaining available side of the laminate by using two-side tape and applying about 47.1 pounds of force for about 10 seconds to secure the laminate to the smaller plate. Thereafter, the plates were separated which resulted in the delamination of the laminate. The force necessary to effect the delamination, in kilograms, was measured. The average adhesive force for this sample which involved setting the bonding roller temperature at 324° F., the anvil roller temperature at 335° F. and the bonding pressure at 30 psi was determined to be about 4.4 kilograms.

It is to be understood that the above disclosure of the presently preferred embodiment of the invention is to be taken as illustrative of the invention. Further, it is clear that, in view of the present disclosure, those of skill in the art should be capable of making numerous modifications without departing from the true spirit and scope of the invention. For example, different combinations of nonelastic webs and elastic sheets could be stretch-bonded together and the elastic sheet could be stretched, by conventional arrangement, in more than one direction.

What is claimed is:

1. An elastic pad formed from a composite elastic laminate which includes an elastic nonwoven web and at least one nonelastic web joined to said elastic nonwoven web at least at two areas and with said nonelastic web being gathered between said two areas, said pad comprising
a top; and
sides depending from said; and
wherein said sides are adapted to retainingly engage an edge of a surface to be covered.

2. The elastic pad of claim 1, wherein said pad is a mattress pad.

3. The elastic pad of claim 1, wherein said pad is a table pad.

4. The elastic pad of claim 1, wherein the composite elastic laminate has an interlayer bonding force of at least 2 kilograms.

5. The elastic pad of claim 4, wherein the interlayer bonding force is from about 2.5 to about 4.5 kilograms.

6. An elastic pad formed from a composite elastic laminate which includes an elastic nonwoven web and at least one nonelastic web joined to said elastic nonwoven web at least at two areas and with said nonelastic web being gathered between said two areas, said pad comprising:
a top; and
sides depending from said top; and
wherein said sides are adapted to retainingly engage an edge of a surface to be covered.

7. The elastic pad of claim 6, wherein said elastic sheet is an elastic nonwoven web of meltblown fibers.

8. The elastic pad of claim 7, wherein the basis weight of the elastic nonwoven web is from about 10 grams per square meter to about 200 grams per square meter.

9. The elastic pad of claim 7, wherein the basis weight of the nonelastic web is from about 1 ounce per square yard to about 5 ounces per square yard.

10. The elastic pad of claim 7, wherein said meltblown fibers are meltblown microfibers.

11. The elastic pad of claim 7, wherein the nonelastic web is apertured.

12. An elastic pad comprising:
a top; and
sides depending from said top that are adapted to retainingly engage an edge of a surface to be covered; and
wherein said elastic pad is formed from a stretch-bonded laminate; including
an elastic nonwoven web, said elastic web comprising fibers of a polyetherurethane material; and
at least one nonelastic nonwoven web of spunlaced hydraulically entangled polyester fibers joined to said elastic web at least at two areas, said nonelastic web being gathered between said two areas.

13. An elastic pad comprising:
a top; and
sides depending from said top that are adapted to retainingly engage an edge of a surface to be covered; and
wherein said elastic pad is formed from a stretch-bonded laminate, said laminate including:
an elastic nonwoven web, said elastic web comprising fibers of a polyetherester material having the formula of;

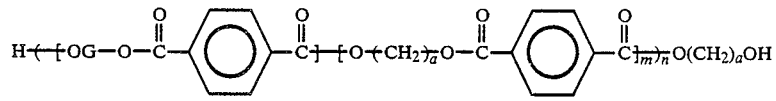

where
"G" is selected from the group including: poly-(oxyethylene)-alpha, omega-diol poly(oxypropylene)-alpha, omega-diol poly(oxytetramethylene)-alpha, omega-diol and "a", "m" and "n" are positive integers; and
at least one nonelastic nonwoven web of spunlaced hydraulically entangled polyester fibers joined to said elastic web at least at two areas and with said nonelastic web being gathered between said two areas.

14. The elastic pad of claim 13, wherein said polyetherester fibers are meltblown fibers.

15. The elastic pad of claim 14, wherein the basis weight of the elastic nonwoven web is from about 10 grams per square meter to about 200 grams per square meter.

16. The elastic pad of claim 14, wherein the basis weight of the nonelastic web is from about 1 ounce per square yard to about 5 ounces per square yard.

17. The elastic pad of claim 14, wherein said polyetherester material has a melt flow of from about 5.0 to about 6.0 grams per 10 minutes when measured in accordance with ASTM D-1238 at 190° C. under a 2,160 gram load.

18. The elastic pad of claim 14, wherein said meltblown fibers are meltblown microfibers.

19. The elastic pad of claim 14, wherein the nonelastic web is apertured.

20. The elastic pad of claim 14, wherein the nonelastic web further comprises fibers selected from the group consisting of rayon fibers or wood pulp fibers.

21. An elastic pad comprising:
a top; and
sides depending from said top that are adapted to retainingly engage an edge of a surface to be covered; and
wherein said elastic pad is formed from a palindromic stretch-bonded laminate, said laminate including:
an inner elastic nonwoven web having a basis weight of from about 20 grams per square meter to about 100 grams per square meter, said elastic web comprising meltblown fibers of a polyetheresterurethane material having a melt index of from about 5 grams per 10 minutes to about 20 grams per 10 minutes when measured at 190 degrees C. under a 2,160 gram load; and
two outer nonelastic nonwoven webs comprising spunlaced hydraulically entangled polyester fibers, said nonelastic webs each having a basis weight of from about 1 ounce per square yard to about 5 ounces per square yard.

22. An elastic pad comprising:
a top; and
sides depending from said top that are adapted to retainingly engage an edge of a surface to be covered; and
wherein said elastic pad is formed from a palindromic stretch-bonded laminate including:
an inner elastic nonwoven web having a basis weight of from about 20 grams per square meter to about 100 grams per square meter, said elastic web comprising meltblown fibers of a polyetherester material having the formula of:

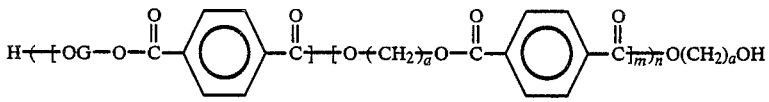

where
"G" is selected from the group including: poly(oxyethylene)-alpha, omega-diol poly(oxypropylene)-alpha, omega-diol poly(oxytetramethylene)-alpha, omega-diol and "a", "m" and "n" are positive integers; and
two outer nonelastic nonwoven webs comprising spunlaced hydraulically entangled polyester fibers, said nonelastic webs each having a basis weight of from about 1 ounce per square yard to about 5 ounces per square yard.

23. The elastic pad of claim 22, wherein the nonelastic web further comprises fibers selected from the group consisting of rayon fibers or wood pulp fibers.

24. The elastic pad of claim 22, wherein said meltblown fibers are meltblown microfibers.

25. The elastic pad of claim 22, wherein the nonelastic web is apertured.

26. The elastic pad of claim 22, wherein the composite elastic laminate has an interlayer bonding force of at least 2 kilograms.

27. The elastic pad of claim 26, wherein the interlayer bonding force is from about 2.5 to about 4.5 kilograms.

28. The elastic pad of claim 1, wherein said pad has a substantially rectangular shape.

29. The elastic pad of claim 1, wherein said pad has a substantially circular shape.

30. The elastic pad of claim 1, wherein said pad has a substantially square shape.

31. The elastic pad of claim 1, wherein said pad is capable of stretching at least about 25 percent in at least one direction.

32. The elastic pad of claim 1, wherein said pad is a table pad.

33. The elastic pad of claim 1, wherein said pad is a mattress pad.

34. The table pad of claim 32 having from about 40 percent to about 100 percent stretch in the machine direction and having up to about 40 percent stretch in the cross-machine direction.

35. The mattress pad of claim 33, wherein said pad is capable of stretching at least about 50 percent in at least one direction.

36. The mattress pad of claim 33, wherein said pad is capable of stretching from about 50 percent to about 100 percent in at least one direction.

37. The mattress pad of claim 33, wherein said pad is capable of stretching about 75 percent in at least one direction.

38. The elastic pad of claim 22, wherein said pad has a substantially rectangular shape.

39. The elastic pad of claim 22, wherein said pad has a substantially rectangular shape.

40. The elastic pad of claim 22, wherein said pad has a substantially rectangular shape.

41. The elastic pad of claim 22, wherein said pad is capable of stretching at least about 25 percent in at least one direction.

42. The elastic pad of claim 22, wherein said pad is a table pad.

43. The elastic pad of claim 22, wherein said pad is a mattress pad.

44. The table pad of claim 42 having from about 40 percent to about 100 percent stretch in the machine direction and having up to about 40 percent stretch in the cross-machine direction.

45. The mattress pad of claim 43, wherein said pad is capable of stretching at least 50 percent in at least one direction.

46. The mattress pad of claim 43, wherein said pad is capable of stretching from about 50 percent to about 75 percent in at least one direction.

47. The mattress pad of claim 43, wherein said pad is capable of stretching about 75 percent in at least one direction.

48. The elastic pad of claim 1, wherein said nonelastic web is a nonelastic nonwoven web.

49. The elastic pad of claim 6, wherein said nonelastic web is a nonelastic nonwoven web.

UNITED STATES PATENT AND TRADEMARK OFFICE
CERTIFICATE OF CORRECTION

PATENT NO. : 4,801,482

DATED : January 31, 1989

INVENTOR(S) : Gary L. Goggans et al.

It is certified that error appears in the above-identified patent and that said Letters Patent is hereby corrected as shown below:

Column 2, line 44, "It this" should read -- If this --.

Column 5, line 49, after "about" insert -- 1,600 psi to about 1,800 psi; a specific gravity of from about --.

Column 8, line 29, "flexrual" should read -- flexural --.

Column 9, lines 43 and 44, delete "for example a patterned calendar embossing roller 28,"

Column 15, line 53, after "said" insert -- top --.

Signed and Sealed this

Twenty-first Day of November, 1989

Attest:

JEFFREY M. SAMUELS

*Attesting Officer*  *Acting Commissioner of Patents and Trademarks*